US012725427B2

(12) United States Patent
Wen et al.

(10) Patent No.: US 12,725,427 B2
(45) Date of Patent: Sep. 1, 2026

(54) METHOD AND COMPUTING SYSTEM FOR VEHICLE MOTION FORECASTING

(71) Applicants: HON HAI PRECISION INDUSTRY CO., LTD., New Taipei City (TW); Foxconn Technology Group Co., Ltd., Guangdong Province (CN)

(72) Inventors: Zi-Hao Wen, New Taipei City (TW); Yi-Fan Zhang, New Taipei City (TW); Xin-Hong Chen, New Taipei City (TW); Jian-Ping Wang, New Taipei City (TW); Yung-Hui Li, New Taipei City (TW)

(73) Assignees: HON HAI PRECISION INDUSTRY CO., LTD., New Taipei (TW); Foxconn Technology Group Co., Ltd., Guangdong Province (CN)

( * ) Notice: Subject to any disclaimer, the term of this patent is extended or adjusted under 35 U.S.C. 154(b) by 111 days.

(21) Appl. No.: 18/666,838

(22) Filed: May 17, 2024

(65) Prior Publication Data

US 2024/0386723 A1 Nov. 21, 2024

Related U.S. Application Data

(60) Provisional application No. 63/502,919, filed on May 17, 2023.

(51) Int. Cl.
*G01C 21/00* (2006.01)
*G06V 20/58* (2022.01)

(52) U.S. Cl.
CPC ............ *G06V 20/58* (2022.01); *G01C 21/38* (2020.08)

(58) Field of Classification Search
CPC ... B60W 60/0027; G01C 21/26; G01C 21/38; G06V 20/58; G08G 1/0112; G08G 1/0129; G08G 1/0133; G08G 1/0141; G08G 1/0145; G08G 1/164; G08G 1/167
See application file for complete search history.

(56) References Cited

U.S. PATENT DOCUMENTS 10,235,601 B1 * 3/2019 Wrenninge ........... G06F 18/214
10,832,439 B1 * 11/2020 Ma ....................... G05D 1/0274
11,801,871 B1 * 10/2023 Choudhury ....... B60W 50/0097
(Continued)

FOREIGN PATENT DOCUMENTS

CN 114802296 A 7/2022
CN 114842660 A 8/2022
CN 114872718 A 8/2022

*Primary Examiner* — Peter D Le
(74) *Attorney, Agent, or Firm* — CKC & Partners Co., LLC

(57) ABSTRACT

A method for vehicle motion forecasting includes the following steps. A lane graph structure is generated according to a raw map data. Multiple occupancy flow graphs which are homogeneous to data format of the lane graph structure are established according to trajectory data of a plurality of vehicles in multiple consecutive frames and the lane graph structure. Multiple temporal edges between the occupancy flow graphs are established according to the trajectory data of the vehicles in the consecutive frames to construct a temporal occupancy flow graph. Feature aggregation is performed on the temporal occupancy flow graph to generate multiple updated node features, and a motion forecasting of an ego-vehicle is generated according to the updated node features.

15 Claims, 12 Drawing Sheets

(56) References Cited

U.S. PATENT DOCUMENTS

| | | | | |
|---|---|---|---|---|
| 11,975,726 | B1 * | 5/2024 | Gu | G06N 3/044 |
| 2016/0071312 | A1 * | 3/2016 | Laine | G06T 17/10 345/419 |
| 2016/0205509 | A1 * | 7/2016 | Hopcraft | H04W 64/006 455/456.1 |
| 2017/0284814 | A1 * | 10/2017 | Gaither | G01C 21/3658 |
| 2018/0208185 | A1 * | 7/2018 | Nagraj Rao | B60W 30/0956 |
| 2021/0004012 | A1 * | 1/2021 | Marchetti-Bowick | G05D 1/0221 |
| 2022/0011122 | A1 * | 1/2022 | He | G06V 10/82 |
| 2022/0355825 | A1 * | 11/2022 | Deo | G06N 3/0464 |

* cited by examiner

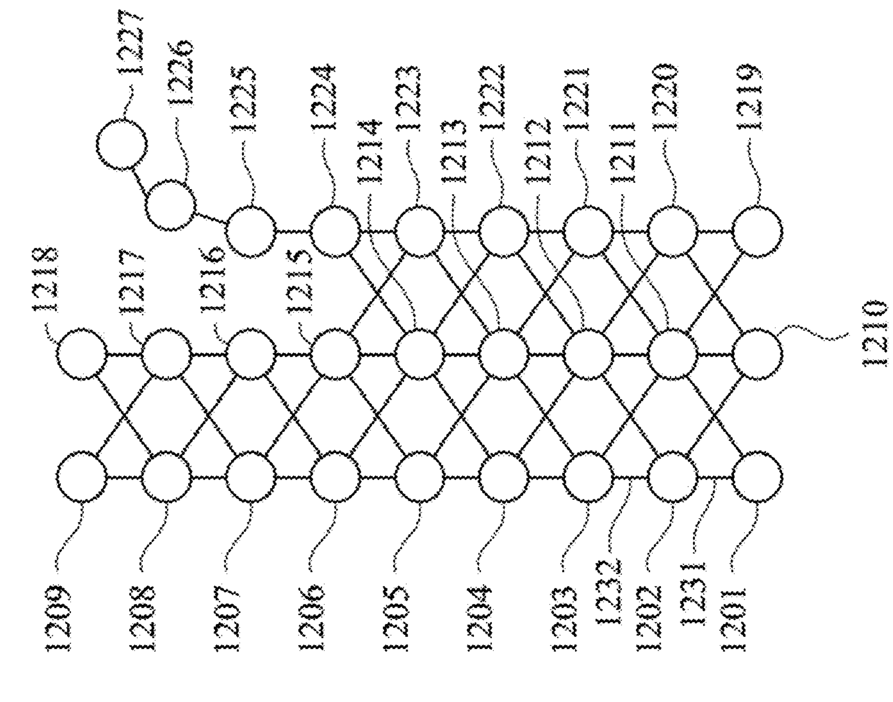
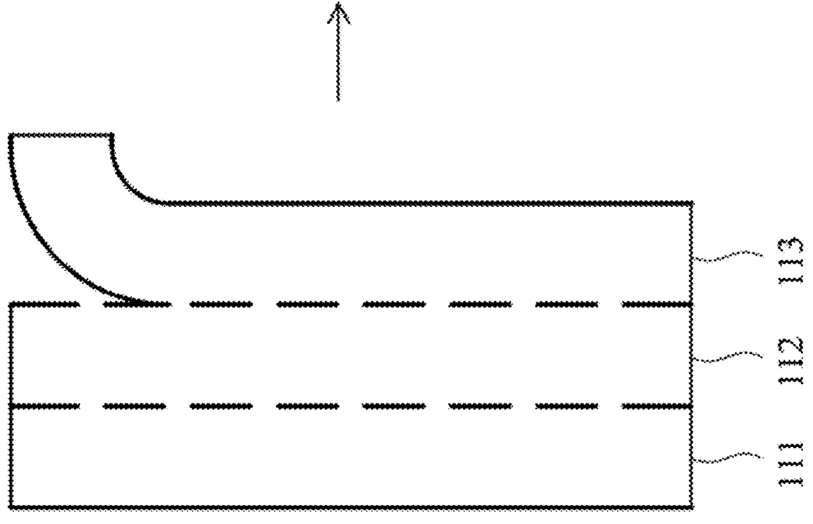
Fig. 3

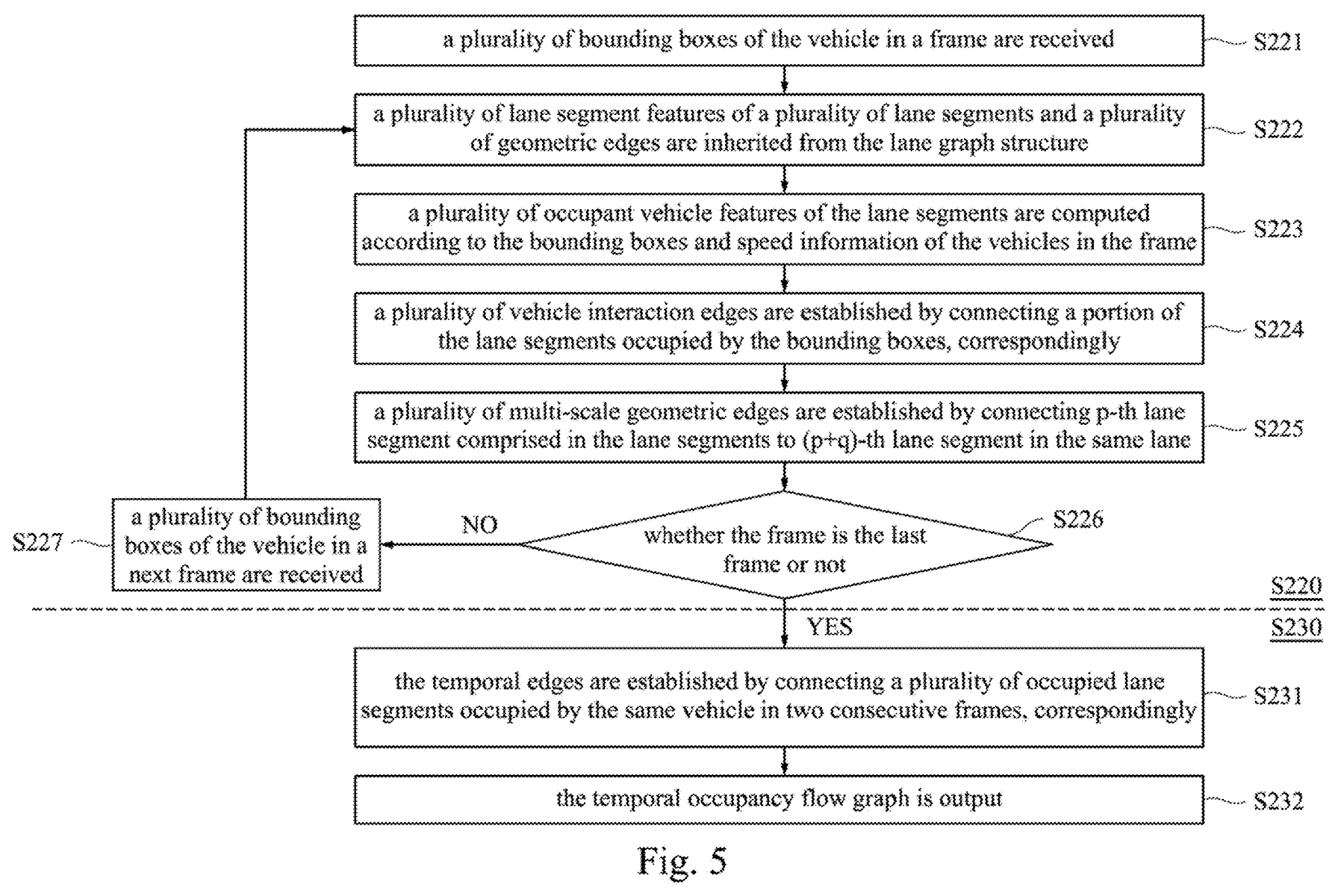

S220

S221 a plurality of bounding boxes of the vehicle in a frame are received

S222 a plurality of lane segment features of a plurality of lane segments and a plurality of geometric edges are inherited from the lane graph structure S223 a plurality of occupant vehicle features of the lane segments are computed according to the bounding boxes and speed information of the vehicles in the frame S224 a plurality of vehicle interaction edges are established by connecting a portion of the lane segments occupied by the bounding boxes, correspondingly S225 a plurality of multi-scale geometric edges are established by connecting p-th lane segment comprised in the lane segments to (p+q)-th lane segment in the same lane S226 whether the frame is the last frame or not

NO

S227 a plurality of bounding boxes of the vehicle in a next frame are received

YES

S230

S231 the temporal edges are established by connecting a plurality of occupied lane segments occupied by the same vehicle in two consecutive frames, correspondingly S232 the temporal occupancy flow graph is output

Fig. 5

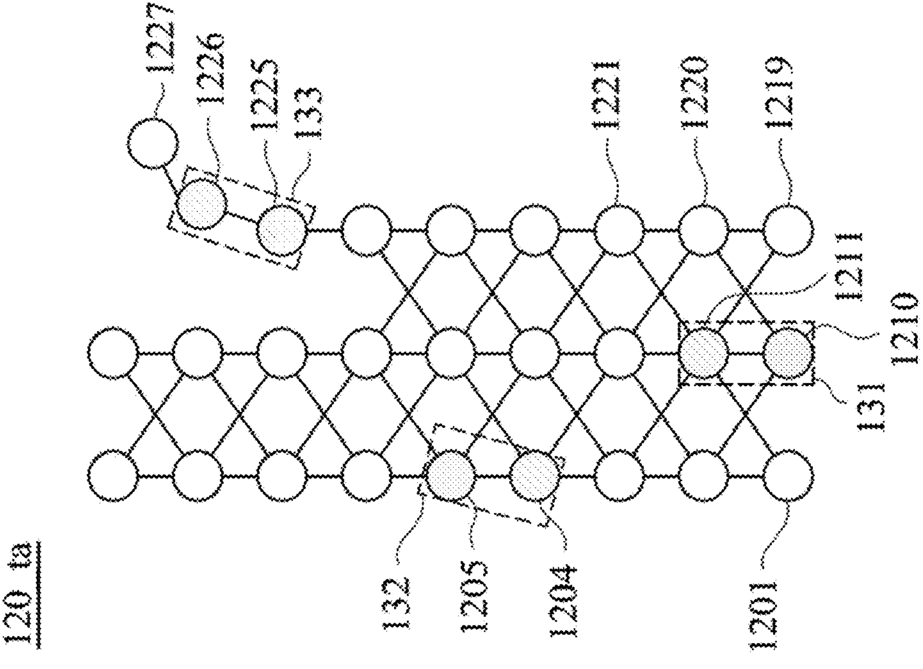
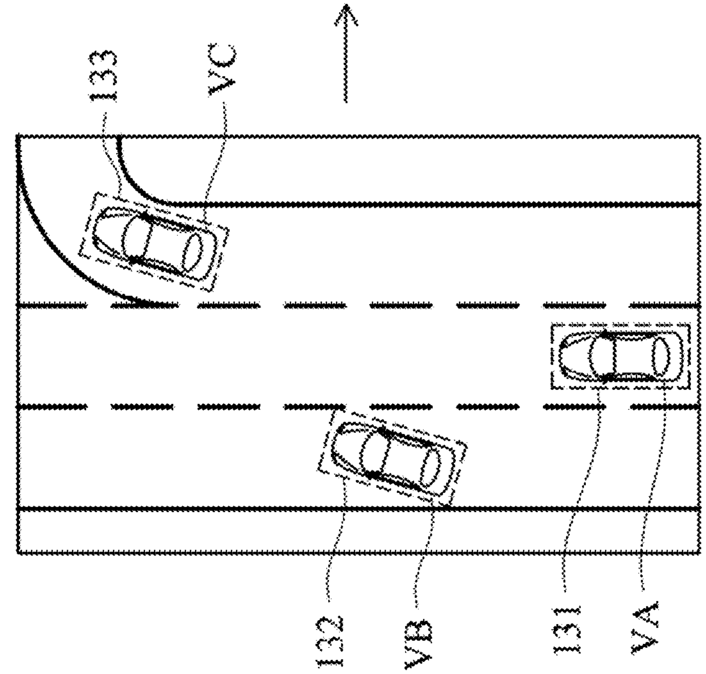
Fig. 6A

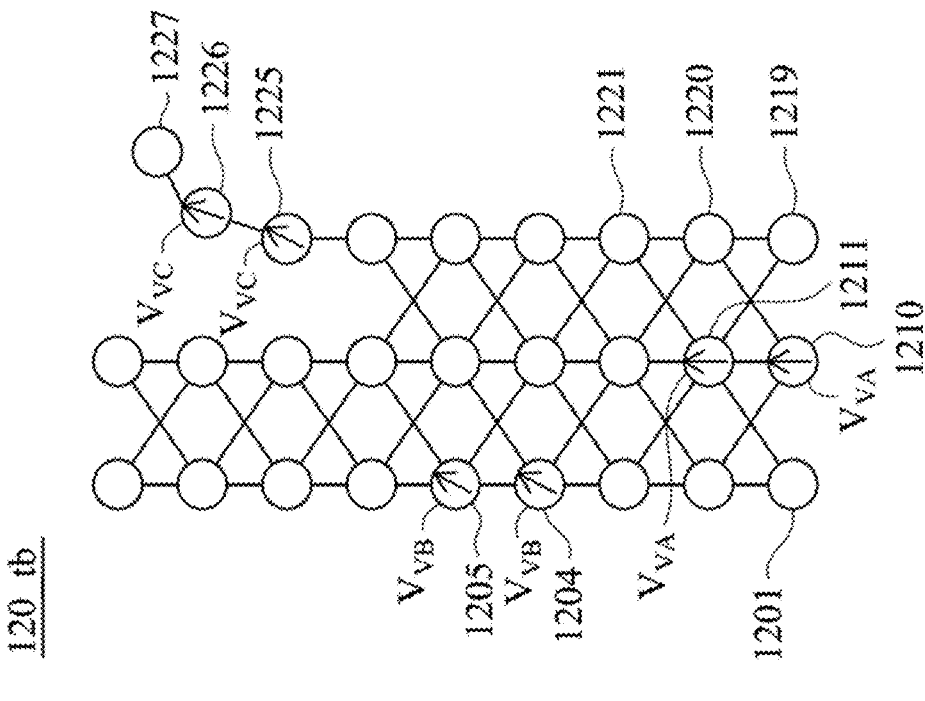
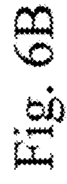
Fig. 6B
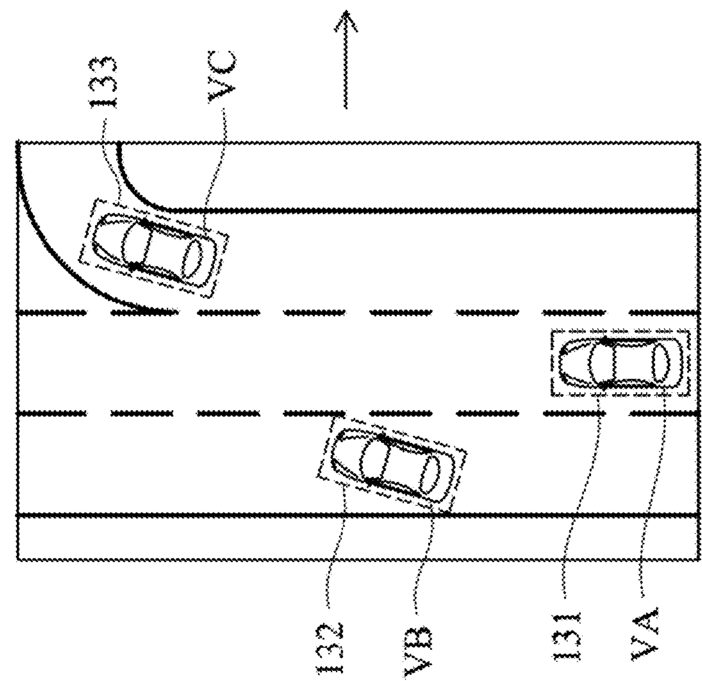

500

METHOD AND COMPUTING SYSTEM FOR VEHICLE MOTION FORECASTING

CROSS-REFERENCE TO RELATED APPLICATION

This application claims priority to U.S. Provisional Application Ser. No. 63/502,919, filed May 17, 2023, which is herein incorporated by reference in its entirety.

BACKGROUND

Field of Invention

The present invention relates to a method and system for vehicle motion forecasting. More particularly, the present invention relates to a method and system for vehicle motion forecasting in an environment.

Description of Related Art

Nowadays, graph neural networks are common to be used in trajectory prediction and path planning to extract interaction relationship between objects. The said interaction relationship includes two major types, which are vehicle-to-vehicle interaction and vehicle-to-lane interaction. However, different attention layers are usually designed to extract vehicle-to-vehicle interaction and the vehicle-to-lane interaction. In this case, there may occur bias in the interaction information due to the order of operations, it causes decreasing of accuracy for prediction outcomes. Therefore, how to provide a method and a system for vehicle motion forecasting to solve the above problems are the important issue in this field.

SUMMARY

The present disclosure provides a method for vehicle motion forecasting including following steps. A lane graph structure is generated according to a raw map data. A plurality of occupancy flow graphs which are homogeneous to data format of the lane graph structure are established according to trajectory data of a plurality of vehicles in a plurality of consecutive frames and the lane graph structure. A plurality of temporal edges between the occupancy flow graphs are established according to the trajectory data of the vehicles in the consecutive frames, to construct a temporal occupancy flow graph. Feature aggregation is performed on the temporal occupancy flow graph to generating a plurality of updated node features, and generating a motion prediction of an ego-vehicle according to the updated node features.

The present disclosure provides a method for vehicle motion forecasting including following steps. A lane graph structure is generated according to a raw map data. A plurality of first bounding boxes of a plurality of vehicles in a first frame are mapped onto the lane graph structure to generate a first occupancy flow graph. A plurality of second bounding boxes of the vehicles in a second frame are mapped onto the lane graph structure to generate a second occupancy flow graph, and wherein the first frame and the second frame are consecutive frames. Temporal edges are established between the first occupancy flow graph and the second occupancy flow graph to construct a temporal occupancy flow graph. Feature aggregation is performed on the temporal occupancy flow graph to generate a plurality of updated node features, and generating a motion prediction of an ego-vehicle according to the updated node features.

The present disclosure provides a computing system. The computing system includes a memory and a processing circuit. The memory is configured to store data and a plurality of instructions. The processing circuit is connected to the memory. The processing circuit is configured to access the data and the instructions stored in the memory to execute the following steps. A lane graph structure is generated according to a raw map data. A plurality of occupancy flow graphs which are homogeneous to data format of the lane graph structure are established according to trajectory data of a plurality of vehicles in a plurality of consecutive frames and the lane graph structure. A plurality of temporal edges are established between the occupancy flow graphs according to the trajectory data of the vehicles in the consecutive frames, to construct a temporal occupancy flow graph. Feature aggregation is performed on the temporal occupancy flow graph to generating a plurality of updated node features, and generating a motion prediction of an ego-vehicle according to the updated node features.

Summary, the vehicle motion forecasting method of the present disclosure is to establish multiple occupancy flow graphs based on lane graph structure, and establish temporal edges between the occupancy flow graphs to construct a temporal occupancy flow graph. As such, when the feature aggregation is performed on the temporal occupancy flow graph, the vehicle-to-vehicle and vehicle-to-lane interactions can be extracted at the same time, so as to avoid the information bias caused by extracted the aforesaid two types of interactions from different attention layers, and to increase the accuracy of motion prediction of the ego-vehicle.

BRIEF DESCRIPTION OF THE DRAWINGS

The present disclosure can be more fully understood by reading the following detailed description of the embodiment, with reference made to the accompanying drawings as follows.

FIG. 3 depicts a flow chart of operation of establishing a lane graph structure according to some embodiments of the present disclosure.

FIG. 5 depicts a flow chart of steps S220~S230 included in the method for forecasting vehicle motion according to some embodiments of the present disclosure.

FIG. 6A to FIG. 6D depict schematic diagrams of occupant vehicle features, multi-scale geometric edges and vehicle interaction edges of a occupancy flow graph according to some embodiments of the present disclosure.

DETAILED DESCRIPTION

Figure 1:
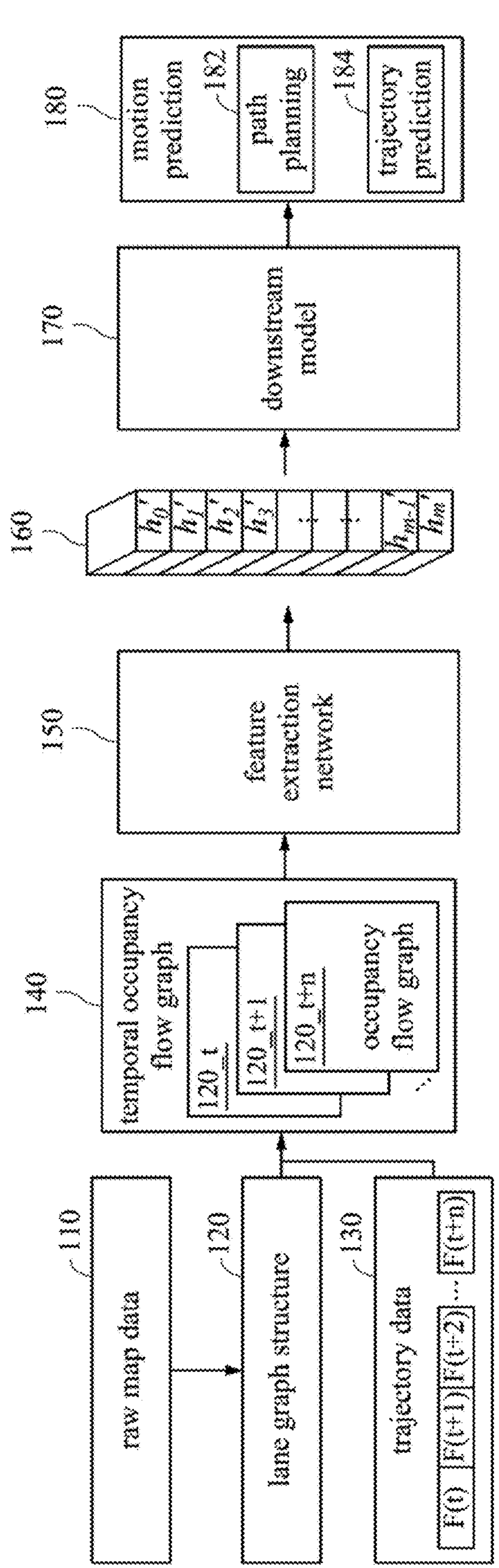
FIG. 1 depicts a schematic diagram of establishment and utilization of the temporal occupancy flow graph for forecasting the vehicle motion according to some embodiments of the present disclosure.

Reference will now be made in detail to embodiments of the present disclosure, examples of which are described herein and illustrated in the accompanying drawings. While the disclosure will be described in conjunction with embodiments, it will be understood that they are not intended to limit the disclosure to these embodiments. Description of the operation does not intend to limit the operation sequence. Any structures resulting from recombination of elements with equivalent effects are within the scope of the present disclosure. It is noted that, in accordance with the standard practice in the industry, the drawings are only used for understanding and are not drawn to scale. Hence, the drawings are not meant to limit the actual embodiments of the present disclosure. In fact, the dimensions of the various features may be arbitrarily increased or reduced for clarity of discussion. Wherever possible, the same reference numbers are used in the drawings and the description to refer to the same or like parts for better understanding.

In the description herein and throughout the claims that follow, unless otherwise defined, all terms have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In the description herein and throughout the claims that follow, the terms "comprise" or "comprising," "include" or "including," "have" or "having," "contain" or "containing" and the like used herein are to be understood to be open-ended, i.e., to mean including but not limited to.

A description is provided with reference to FIG. 1. FIG. 1 depicts a schematic diagram of architecture for establishment and utilization of the temporal occupancy flow graph 140 for forecasting the vehicle motion according to some embodiments of the present disclosure. As shown in FIG. 1, the raw map data 110 is transformed to the lane graph structure 120. In some embodiments, the raw map data 110 is an electronic map. In some embodiments, geometry of position of the raw map data 110 conform to the specification of the high-definition map (HD map). In some embodiments, the raw map data 110 is high-definition map. In some embodiments, the raw map data 110 is static map data, which includes reliable environment information, such as, lanes, lane lines, center lines of roads and other related information. In some embodiments, the lane graph structure 120 is generated based on the lanes, lane lines, center lines of roads extracted from the environment information of the raw map data 110. In some embodiments, the lane graph structure 120 includes information of position and geometry of each lane segment on the lanes.

In some embodiments, the lane graph structure 120 is a spatial data in an environment, and the trajectory data 130 is motions of vehicles moved with time in this environment. In some embodiments, the trajectory data 130 is the trajectory of vehicles in past time series. In some embodiments, the trajectory data 130 includes the trajectory data, e.g., motion path and speed information, of the vehicles in frames F(t)~F(t+n). In some embodiments, the frames F(t)~F(t+n) are consecutive frames. In some embodiments, the frames F(t)~F(t+n) are image frames. In some embodiments, the frames F(t)~F(t+n) are established based on vehicle recognition results in images captured from one or more sensors.

In some embodiments, the temporal occupancy flow graph 140 includes occupancy flow graphs 120_*t*~120_*t+n*. In some embodiments, motion data of the vehicles in the consecutive frames F(t)~F(t+n) is mapped to the lane graph structure 120, respectively, so as to generate occupancy flow graphs 120_*t*~120_*t+n*, and temporal edges are established between the occupancy flow graphs 120_*t*~120_*t+n* to construct a temporal occupancy flow graph 140. In some embodiments, the temporal occupancy flow graph 140 includes feature of each of the occupancy flow graphs 120_*t*~120_*t+n* and the said temporal edges.

In some embodiments, the feature extraction network 150 performs feature aggregation on the temporal occupancy flow graph 140 to extract the vehicle-to-vehicle interaction and vehicle-to-lane interaction at the same time, and generates the updated node features 160. In some embodiments, the feature extraction network 150 is graph neural network. In some embodiments, the feature extraction network 150 is graph attention network. In some embodiments, the feature extraction network 150 is graph convolutional network. In some embodiments, the feature extraction network 150 is heterogeneous graph neural network. Therefore, it is not intended to limit the present disclosure.

In some embodiments, the updated node features 160 are input to the downstream model 170 to generate a motion prediction 180. In some embodiments, the motion prediction 180 can be a downstream task of the path planning 182 or the trajectory prediction 184 for an ego-vehicle in a future period. In some embodiments, the downstream model 170 can be designed according to the downstream tasks (such as, path planning, trajectory prediction or multi-agents forecasting). Therefore, it is not intended to limit the present disclosure.

Figure 2:
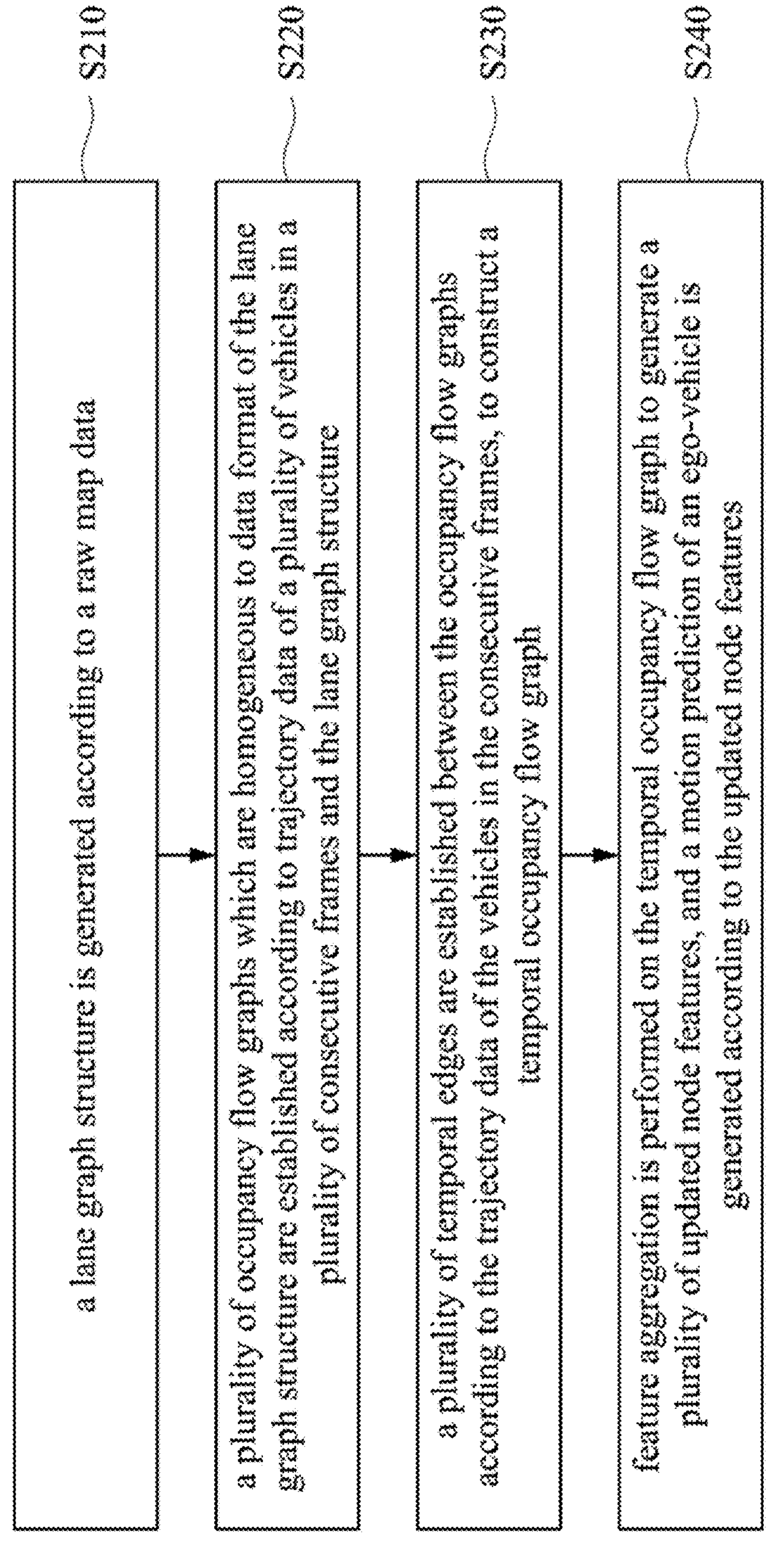
FIG. 2 depicts a flow chart of a method for forecasting vehicle motion according to some embodiments of the present disclosure.

A description is provided with reference to FIG. 1 and FIG. 2. FIG. 2 depicts a flow chart of a method 200 for forecasting vehicle motion according to some embodiments of the present disclosure. As shown in FIG. 2, the vehicle motion forecasting method 200 includes steps S210~S260.

In step S210, a lane graph structure 120 is generated according to a raw map data. For better understanding for the lane graph structure 120, a description is provided with reference to FIG. 3, FIG. 3 depicts a flow chart of operation of establishing a lane graph structure 120 according to some embodiments of the present disclosure.

As shown in FIG. 3, the raw map data 110 includes lanes 111~113. In some embodiments, the lane 111 is divided by a preset distance into lane segments 1201~1209 based on center line of the lane 111. Similarly, the lanes 112~113 are divided by a preset distance into lane segments 1210~1227 based on center lines of the lane lanes 112~113. In some embodiments, the said preset distance can be 0.3 meters. In the other embodiments, the said preset distance can be implemented by the other length, which is not intended to limit the present disclosure. In some embodiments, a start point, an end point and a centroid of each of the lane segments 1201~1227 can be expressed by the following formula.

$$l = [(x_1, y_1) \rightarrow (x_2, y_2)]$$

$$l_c = \left(\frac{x_1 + x_2}{2}, \frac{y_1 + y_2}{2}\right)$$

In above formula, l is a line segment between the start point and the end point of each of the lane segments 1201~1227, in which the start point and the end point are expressed by $(x_1, y_1)$ and $(x_2, y_2)$, respectively. And, $l_c$ is a centroid of each of the lane segments 1201~1227. In some embodiments, each line segment can be expanded to rectangle, in order to compute the interaction between the rectangle of the said line segment and the bounding boxes and the vehicle.

In some embodiment, a geometric edge is expressed by a solid line connected between adjacent two lane segments included in the lane segments 1201~1227. In some embodiments, the geometric edge geometric edge is to connect two lane segments based on drivable path/direction for vehicle. For example, the geometric edge 1231 connects lane segment 1201 to the lane segment 1202, and the geometric edge 1232 connects the lane segment 1202 to the lane segment 1203.

In some embodiments, the lane graph structure 120 includes multiple lane segment features and multiple geometric edges. In some embodiments, each lane segment feature is coordinates of a start point, an end point and a centroid of each of the lane segments 1201~1227. In some embodiments, each the geometric edge is a connection between the adjacent two lane segments included in the lane segments 1201~1227. In some embodiments, the lane segment features of the lane graph structure 120 can be represented by a node feature matrix. In some embodiments, the geometric edges of the lane graph structure 120 can be represented by an adjacency matrix. In some embodiments, if the lane graph structure 120 includes k nodes and each node has e features, the node feature matrix of the lane graph structure 120 has a dimension of (k×e), and the adjacency matrix of the lane graph structure 120 has a dimension of (k×k).

Figure 4:
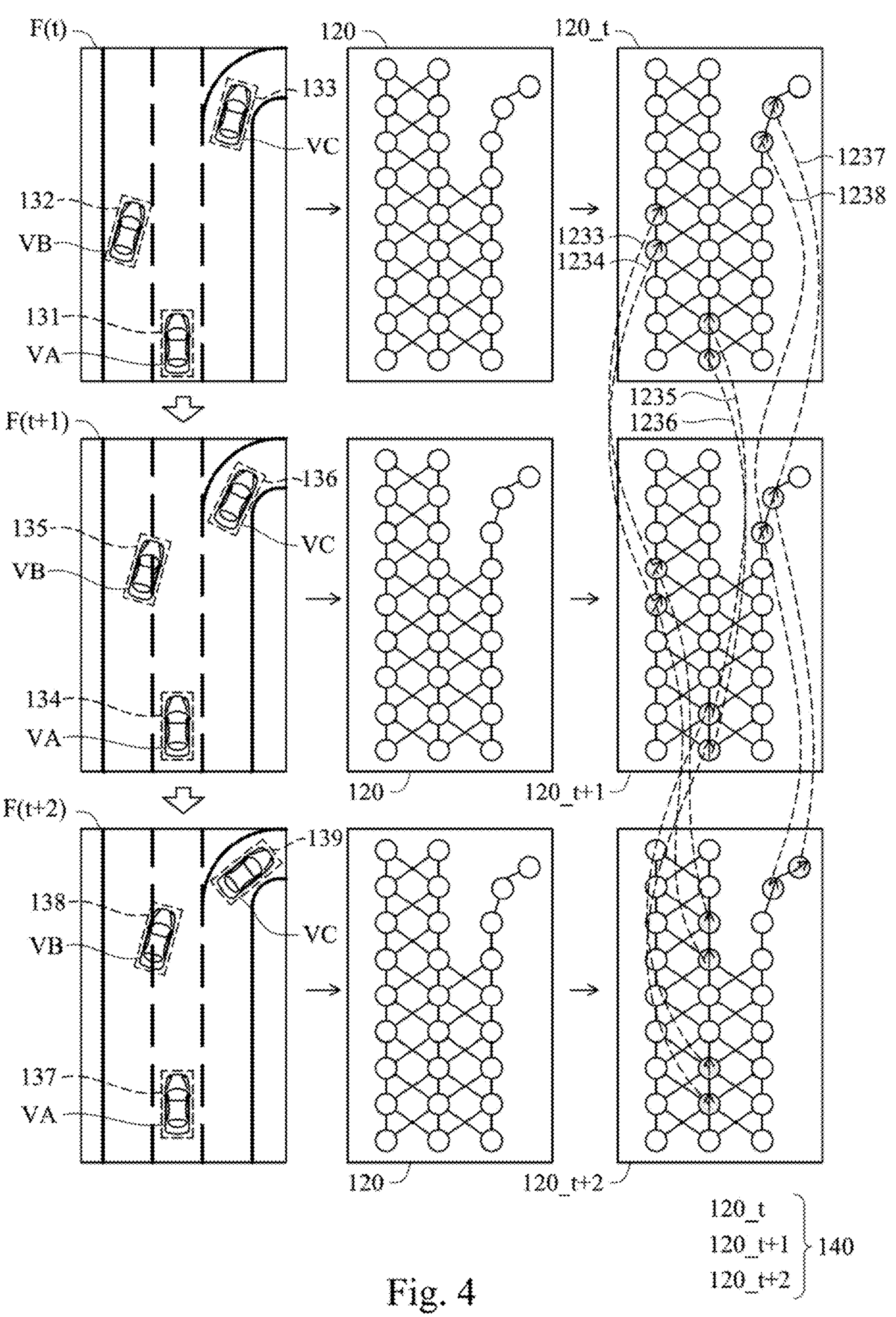
FIG. 4 depicts a flow chart of operation of constructing a temporal occupancy flow graph according to some embodiments of the present disclosure.

In step S220, a plurality of occupancy flow graphs which are homogeneous to data format of the lane graph structure are established according to trajectory data of a plurality of vehicles in a plurality of consecutive frames and the lane graph structure. In some embodiments, the occupancy flow graphs which are homogeneous to data format of the lane graph structure means that the number of the lane segments/nodes of each occupancy flow graph is the same as the number of lane segments/nodes of the lane graph structure, while the number of features of each node of the occupancy flow graph is more than the number of features of each node of the lane graph structure. In some embodiments, each occupancy flow graph includes a node feature matrix and an adjacency matrix. In some embodiments, a node feature matrix of the occupancy flow graph has a dimension of k×[e+f], in which the k×e array is inherited from the lane graph structure 120. In some embodiments, the adjacency matrix of the occupancy flow graph has a dimension of k×k, which includes the geometric edges inherited from the lane graph structure 120. A description is further provided with reference to FIG. 4. FIG. 4 depicts a flow chart of operation of constructing a temporal occupancy flow graph 140 according to some embodiments of the present disclosure.

As shown in FIG. 4, the frame F(t) includes bounding boxes 131~133 of vehicles VA~VC. In some embodiments, the information of speed and driving direction of the vehicles VA~VC are marked in the corresponding bounding boxes 131~133. In some embodiments, the bounding boxes 131~133 of the vehicles VA~VC are mapped to the lane graph structure 120 to construct the occupancy flow graph 120_*t* which is homogeneous to data format of the lane graph structure 120.

In some embodiments, the frame F(t+1) and the frame F are consecutive frames, the frame F(t+1) includes bounding boxes 134~136 of the vehicles VA~VC. In some embodiments, the information of speed and driving direction of the vehicles VA~VC are marked in the corresponding bounding boxes 134~136. In some embodiments, the bounding boxes 134~136 of the vehicles VA~VC are mapped to the lane graph structure 120 to construct the occupancy flow graph 120_*t*+1 which is homogeneous to data format of the lane graph structure 120.

In some embodiments, the frame F(t+2) and the frame F(t+1) are consecutive frames, the frame F(t+2) includes bounding boxes 137~139 of the vehicles VA~VC. In some embodiments, the information of speed and driving direction of the vehicles VA~VC are marked in the corresponding bounding boxes 137~139. In some embodiments, the bounding boxes 137~139 of the vehicles VA~VC are mapped to the lane graph structure 120 to construct the occupancy flow graph 120_*t*+2 which is homogeneous to data format of the lane graph structure 120.

In step S230, a plurality of temporal edges are established between the occupancy flow graphs according to the trajectory data of the vehicles in the consecutive frames, to construct a temporal occupancy flow graph. In some embodiments, the trajectory data of the vehicle VA in the frames F(t)~F(t+2) can be represented by bounding boxes 131, 134 and 137. Similarly, the trajectory data of the vehicle VB in the frames F(t)~F(t+2) can be represented by bounding boxes 132, 135 and 138. And, the trajectory data of the vehicle VC in the frames F(t)~F(t+2) can be represented by bounding boxes 133, 136 and 139. In some embodiments, the occupancy flow graph 120_*t* is connected by temporal edges 1233~1238 to the occupancy flow graph 120_*t*+1, and the occupancy flow graph 120_*t*+1 is connected by temporal edges to the occupancy flow graph 120_*t*+2, so as to establish the temporal occupancy flow graph 140. In some embodiments, the temporal occupancy flow graph 140 includes two or more temporal occupancy flow graphs. In some embodiments, the temporal occupancy flow graph 140 includes the other number of temporal occupancy flow graphs corresponding to time points in a past time series, which is not intended to limit the present disclosure.

For better understanding for features of each of the occupancy flow graphs 120_*t*~120_*t*+2 and the construction of the temporal occupancy flow graph 140, a description is provided with reference to FIG. 3, FIG. 5 and FIG. 6A to FIG. 6D. FIG. 5 depicts a flow chart of steps S220~S230 included in the method 200 for forecasting vehicle motion according to some embodiments of the present disclosure. FIG. 6A to FIG. 6D depict schematic diagrams of occupant vehicle features 120_*ta* and 120_*tb*, multi-scale geometric edges 120_*tc* and vehicle interaction edges 120_*td* of an occupancy flow graph 120_*t* according to some embodiments of the present disclosure.

In step S221, a plurality of bounding boxes of the vehicles in a frame are received. For example, the bounding boxes 131~133 and speed information of the vehicles VA~VC are received.

In step S222, a plurality of lane segment features of a plurality of lane segments and a plurality of geometric edges are inherited from the lane graph structure. In some embodiments, the occupancy flow graph 120_*t* inherits lane segment features of the lane segments 1201~1227 and geometric edges from the occupancy flow graph 120_*t*, the lane segments 1201~1227 and geometric edges of the lane graph structure 120 are shown in FIG. 3.

In some embodiments, if the lane graph structure 120 includes k lane segments, the occupancy flow graph 120_*t* inherits the said k lane segments from lane graph structure 120 and the connection relationship between the said k lane segments. In some embodiments, the connection relationship between the said k lane segments can be represented by an adjacency matrix of k×k size.

In step S223, a plurality of occupant vehicle features of the lane segments are computed according to the bounding boxes and speed information of the vehicles in the frame. In some embodiments, the lane segments 1201~1227 of the occupancy flow graph 120_*t* includes the occupant vehicle features 120_*ta* and 120_*tb*.

In some embodiments, the occupant vehicle feature 120_*ta* includes the vehicle occupancy value of each of the lane segments 1201~1227, the said vehicle occupancy value means that whether the lane segment is occupied by the bounding box of the vehicle. In some embodiments, the lane segments occupied by the bounding boxes 131~133 of the vehicles can be considered as occupied lane segments, a vehicle occupancy value of each occupied lane segment can be represented by 1. On the other hand, lane segments which are not occupied by the bounding boxes of the vehicles can be considered as non-occupied lane segments, the vehicle occupancy value of each non-occupied lane segment can be represented by 0. In some embodiments, if there is more than one bounding boxes of vehicles interacting with a rectangle of a lane segment, a vehicle in one of the bounding boxes which is closest to or include a centroid of the lane segment can be considered as the occupier.

As shown FIG. 6A, the lane segments 1210~1211 are occupied by the bounding box 131 of the vehicle VA, and the vehicle occupancy value of each of the lane segments 1210~1211 can be represented by 1. Similarly, the lane segments 1204~1205 are occupied by the bounding boxes 132 and 133 of the vehicles VB and VC, and the vehicle occupancy value of each of the lane segments 1204~1205 and 1225~1226 can be represented by 1. In some embodiments, the vehicle occupancy value of each of the lane segments 1219~1221 can be represented by 0.

In some embodiments, the occupant vehicle feature 120_*tb* includes the occupancy flow vector of each of the lane segments 1201~1227. The occupancy flow vectors of the occupied lane segments in the lane segments 1201~1227 includes velocity, yaw and yaw rate of the occupant vehicle. The occupancy flow vectors of the non-occupied lane segments (such as, the lane segments 1219~1221) in the lane segments 1201~1227 can be represented by a set of 0. In some embodiments, the occupancy flow vector can be expressed by the following formula.

$$V=(-v_x,-v_y,\theta,\omega)$$

In above formula, V is the occupancy flow vector, $v_x$ is the component of velocity of the vehicle along the x-axis, $v_y$ is the component of velocity of the vehicle along the y-axis, θ is the yaw angle of the vehicle occupying the lane segment, and the ω is the yaw rate of the vehicle occupying the lane segment. In the above formula, the negative velocity is for backward flow representation.

As shown in FIG. 6B, the occupancy flow vector $V_{VA}$ of the lane segments 1210~1211 can be computed according to the speed information of the vehicle VA, as such the occupancy flow vector $V_{VA}$ includes the velocity, the driving direction and the yaw rate of the vehicle VA. Similarly, the occupancy flow vectors $V_{VB}$ and $V_{VC}$ of the lane segments 1204~1205 and 1225~1226 can be computed according to the speed information of the vehicles VA and VB. In some embodiments, the occupancy flow vector of each of the lane segments 1219~1221 can be represented by a set of 0.

In step S224, a plurality of vehicle interaction edges are established by connecting a portion of the lane segments occupied by the bounding box, correspondingly. In some embodiments, the vehicle interaction edges are connection between the occupied lane segments on a basis of the interaction of different vehicles in the same frame. In some embodiments, the vehicle interaction edge is connection between lane segments occupied by two vehicles or two bounding boxes in the same frame whose distance is less than a threshold. In some embodiments, the said threshold can be 100 meters or can be empirically set to the other value, which is not intended to limit the present disclosure. In some embodiments, if two bounding boxes of two vehicles occupy different number of lane segments, the lane segments occupied by the two vehicles are respectively sorted in sequence along the lanes, and the lane segments in the same order are connected to each other to establish the vehicle interaction edge.

Figure 6D:
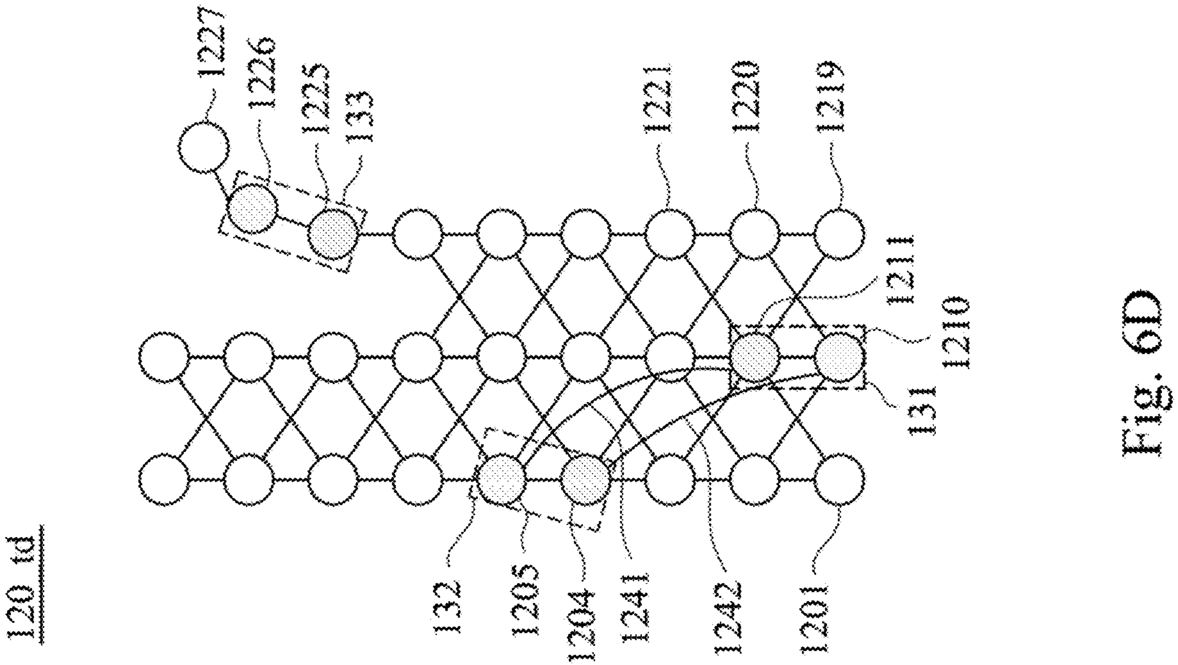

As shown in FIG. 6D, if a distance between the bounding box 132 and the bounding box 131 is less than the threshold, the vehicle interaction edges 1241~1241 connect the lane segments 1204~1205 occupied by the bounding box 132 to the lane segments 1210~1211 occupied by the bounding box 131.

In step S225, a plurality of multi-scale geometric edges are established by connecting p-th lane segment comprised in the lane segments to (p+q)-th lane segment in the same lane. In some embodiments, the said p means each lane segment of the lane graph structure 120, and the said q can be an integer greater than or equal to 2. In some embodiments, the said q can be elements included in a set, such as, q={2,3, . . . z}, in which z is positive integer. In some embodiments, the (p+q)-th lane segment is a lane segment hops away q lane segments from the p-th lane segment in the same lane.

Figure 6C:
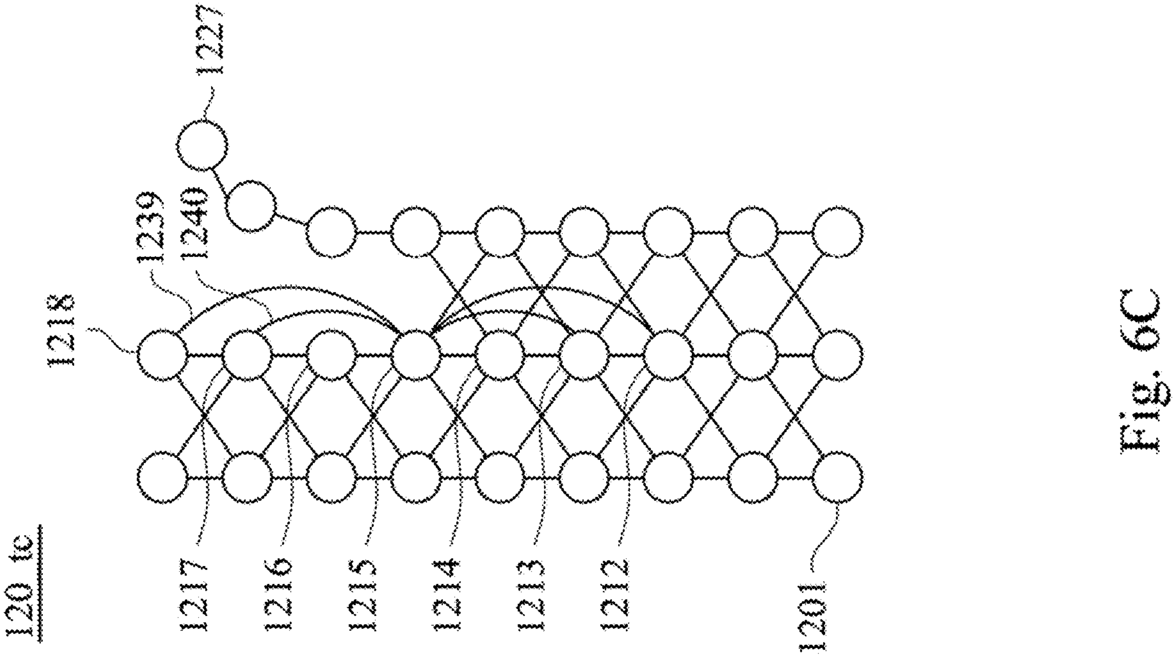

As shown in FIG. 6C, take the fifteenth lane segment 1215 included in the lane graph structure 120 as an example, to establish multi-scale geometric edges under a condition of q={2,3}, a multi-scale geometric edge 1240 is to establish a connection between the lane segment 1215 and the lane segment 1217 which are separated by the lane segment 1216, and a multi-scale geometric edge is to establish a connection between the lane segment 1215 and the lane segment 1213 which are separated by the lane segment 1214. Similarly, a multi-scale geometric edge 1239 is to establish a connection between the lane segment 1215 and the lane segment 1218 which are separated by the lane segments 1216 and 1217, and a multi-scale geometric edge is to establish a connection between the lane segment 1215 and the lane segment 1212 which are separated by the lane segments 1213 and 1214.

In some embodiments, if the occupancy flow graph 120_*t* has k lane segments, the edge connection relationship between the k lane segments of the occupancy flow graph 120_*t* can be expressed by an adjacency matrix of k×k size. In some embodiments, if any two lane segments are connected by the edge (such as, the geometric edge, the vehicle interaction edge and the multi-scale geometric edge), an element in adjacency matrix of k×k size, which corresponds to the connection relationship between the two lane segments, is expressed by 1. On the other hand, if there is no any edge between the two lane segments, an element in adjacency matrix of k×k size, which corresponds to the connection relationship between the two lane segments, is expressed by 0.

In step S226, whether the frame is the last frame or not is determined. If the frame currently used for computation is not the last frame, step S227 is executed to receive the bounding boxes of the vehicles in the next frame, and steps S222~226 are repeated, until all the frames (such as, the frames F(t)~F(t+n)) are obtained. If the frame currently used for computation is not the last frame, step S231 is executed.

Figure 7:
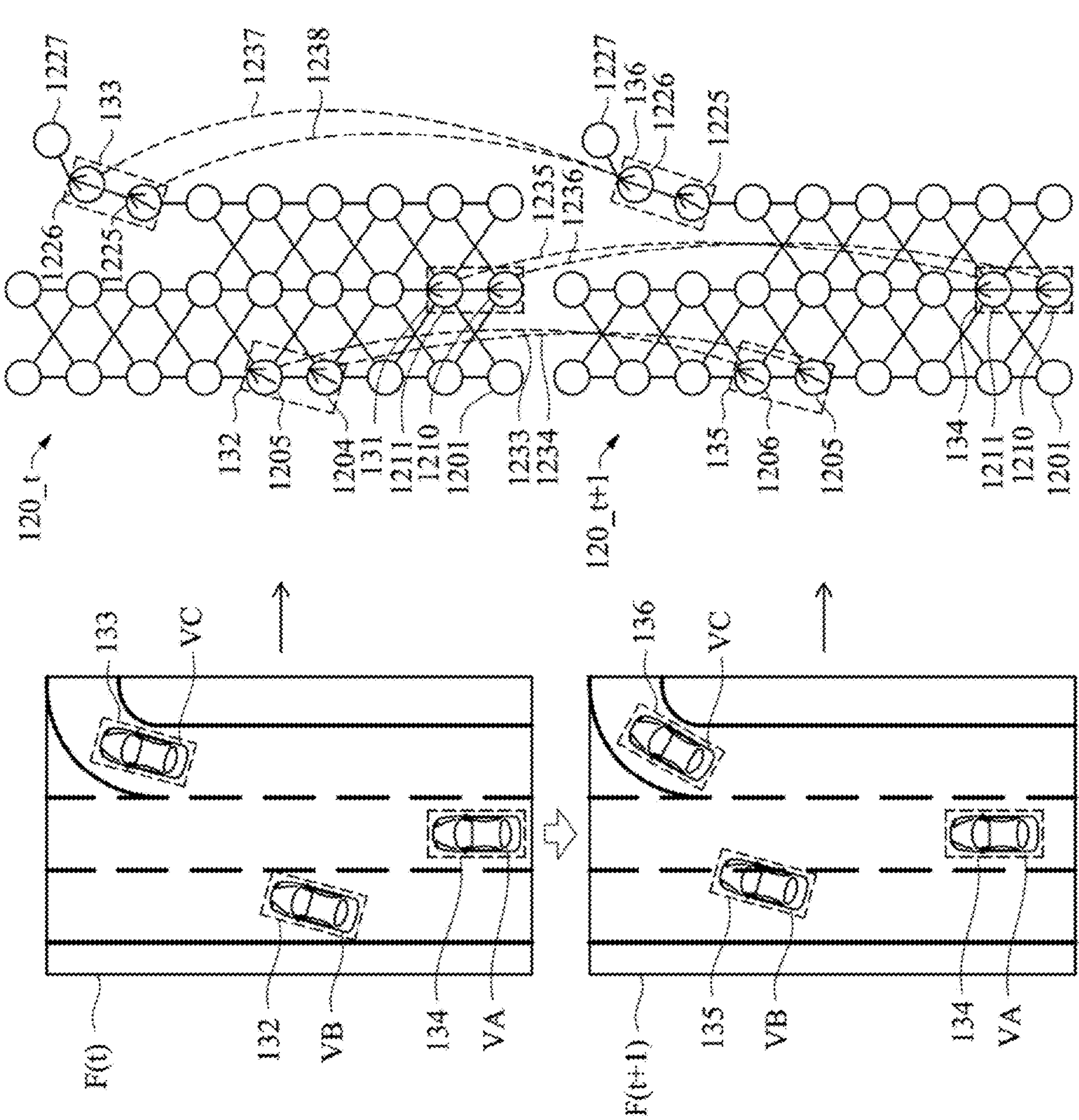
FIG. 7 depicts a schematic diagram of operation of creating temporal edges for temporal occupancy flow graph.

In step S231, the temporal edges are established by connecting a plurality of occupied lane segments occupied by the same vehicle in two consecutive frames, correspondingly. A description is provided with reference to FIG. 7. FIG. 7 depicts a schematic diagram of operation of creating temporal edges for temporal occupancy flow graph 140.

As shown in FIG. 7, the temporal edges 1234 and 1233 connect the lane segments 1204~1205 occupied by the vehicle VB in the frame F(t) to the lane segments 1205~1206 occupied by the vehicle VB in the frame F(t+1). Similarly, the temporal edges 1235~1236 connect the lane segments 1210~1211 occupied by the vehicle VA in the frame F(t) to the lane segments 1210~1211 occupied by the vehicle VA in the frame F(t+1), and the temporal edges 1237~1238 connect the lane segments 1225~1226 occupied by the vehicle VC in the frame F(t) to the lane segments 1225~1226 occupied by the vehicle VC in the frame F(t+1). As such, the temporal edges 1233~1238 connect the lane segments occupied by each of the vehicles VA~VC in the occupancy flow graphs 120_*t*~120_*t*+1 to each other, in order to express the trajectory of the vehicles VA~VC in the frames F(t)~F(t+1).

Similarly, the lane segments occupied by each of the vehicles VA~VC in adjacent two occupancy flow graphs included in the occupancy flow graphs 120_*t*~120_*t*+*n* are connected to each other, in order to construct the temporal occupancy flow graph 140.

In step S232, the temporal occupancy flow graph is output. In some embodiments, all the lane segments included in the occupancy flow graphs 120_*t*~120_*t*+*n* can be considered as nodes of the temporal occupancy flow graph 140. In some embodiments, the temporal occupancy flow graph 140 includes the lane segment features, the occupant vehicle features, the geometric edges, the multi-scale geometric edges and the vehicle interaction edges of each of the occupancy flow graphs 120_*t*~120_*t*+*n*. In some embodiments, since the lane segment features and the geometric edges of each of the occupancy flow graphs 120_*t*~120_*t*+*n* are inherited from the lane graph structure 120, the occupancy flow graphs 120_*t*~120_*t*+*n* of the temporal occupancy flow graph 140 have heterogeneous data format. In some embodiments, a node feature of each node included in the temporal occupancy flow graph 140 has a feature dimension of (e+f), in which the said "e" is the dimension of the lane segment features, and the said "f" is the dimension of the occupant vehicle features (such as, the vehicle occupancy value, the velocity, the yaw angle and yaw rate of the vehicle) of the lane segments. In some embodiments, if each of the occupancy flow graphs 120_*t*~120_*t*+*n* has k lane segments, the temporal occupancy flow graph 140 includes (n+1)*k nodes, in which "(n+1)" is the number of all the occupancy flow graphs 120_*t*~120_*t*+*n* of the temporal occupancy flow graph 140. Accordingly, the adjacency matrix of each of the occupancy flow graphs 120_*t*~120_*t*+*n* are expanded to an expanded adjacency matrix of [(n+1)k]×[(n+1)k] size, and the expanded adjacency matrix is to express whether there is an edge (such as, the geometric edge, the multi-scale geometric edge, the vehicle interaction edge or the temporal edge) between any two nodes included in all the nodes of the temporal occupancy flow graph 140. In some embodiments, if there is an edge (such as, the geometric edge, the multi-scale geometric edge, the vehicle interaction edge or the temporal edge) between two nodes in the temporal occupancy flow graph 140, an element in the expanded adjacency matrix for expressing the connection relationship of the said two nodes is represented by 1. On the other hand, if there is no edge between two nodes in the temporal occupancy flow graph 140, an element in the expanded adjacency matrix for expressing the connection relationship of the said two nodes is represented by 0.

A description is provided with reference to FIG. 1 and FIG. 2, again. In step S240, feature aggregation is performed on the temporal occupancy flow graph to generate a plurality of updated node features, and a motion prediction of an ego-vehicle is generated according to the updated node features. In some embodiments, the temporal occupancy flow graph 140 is input to the feature extraction network 150, the feature extraction network 150 performs node feature aggregation on the nodes of the temporal occupancy flow graph 140 based on the edges of the temporal occupancy flow graph 140, so as to generate multiple updated node features 160. In some embodiments, each of the said updated node features 160 corresponds to a node of the temporal occupancy flow graph 140. In some embodiments, the updated node feature of the i-th node of the temporal occupancy flow graph 140 can be represented by the following formula.

$$h_i' = h_i + \sum_j \phi((h_i \| h_j) W_1) W_2$$

In some embodiments, $h'_i$ is the updated node feature of the i-th node of the temporal occupancy flow graph 140, in which the updated node feature of the i-th node is any one of the updated node feature $h'_0$~$h'_m$ of the temporal occupancy flow graph 140. Where, $h_i$ and $h_j$ are node features of i-th node and j nodes adjacent to i-th node. In some embodiments, $W_1$ and $W_2$ are trainable weight matrix, symbol $\phi$ is the combination of layer normalization and ReLU, and symbol $\|$ is concatenation. In some embodiments, the feature extraction network 150 aggregates the node features of j nodes which are adjacent to the i-th node to the i-th node based on the aforementioned expanded adjacent matrix, so as to generate the updated node feature of the i-th node. In some embodiments, the feature extraction network 150 is a graph attention network. In some embodiments, the vehicles and the lane segments are treated equally as graph nodes in the temporal occupancy flow graph 140. In some embodiments, the spatial edges (such as, the geometric edge, the multi-scale geometric edge and the vehicle interaction edge) of the temporal occupancy flow graph 140 reflect at least two interaction relations (such as, the vehicle-to-vehicle interaction and the vehicle-to lane interaction), and the temporal edges of the temporal occupancy flow graph 140 reflect the spatial-temporal dependencies of the nodes.

To be noted that, since the temporal occupancy flow graph 140 includes the spatial edges (such as, the geometric edge, the multi-scale geometric edge and the vehicle interaction edge) and the temporal edges, the feature extraction network 150 can simultaneously capture vehicle-to-vehicle interaction and the vehicle-to lane interaction from the temporal occupancy flow graph 140 in a consistent manner, it contributes to understand the driving scene, and enhances the performance of the model. Furthermore, compare to two types of data (such as, map data and trajectory data) heterogeneous to each other input to the neural network model, the temporal occupancy flow graph 140 of the present disclosure can simplify the architecture of the neural network model and improve the efficiency of the neural network model.

In some embodiments, the downstream model 170 generates the motion prediction 180 according to the updated node features 160. In some embodiments, the downstream model 170 is a cross attention model to calculate the ego-vehicle's attention score to every node of the temporal occupancy flow graph 140, and to plan the future trajectory of the ego-vehicle.

Figure 8A:
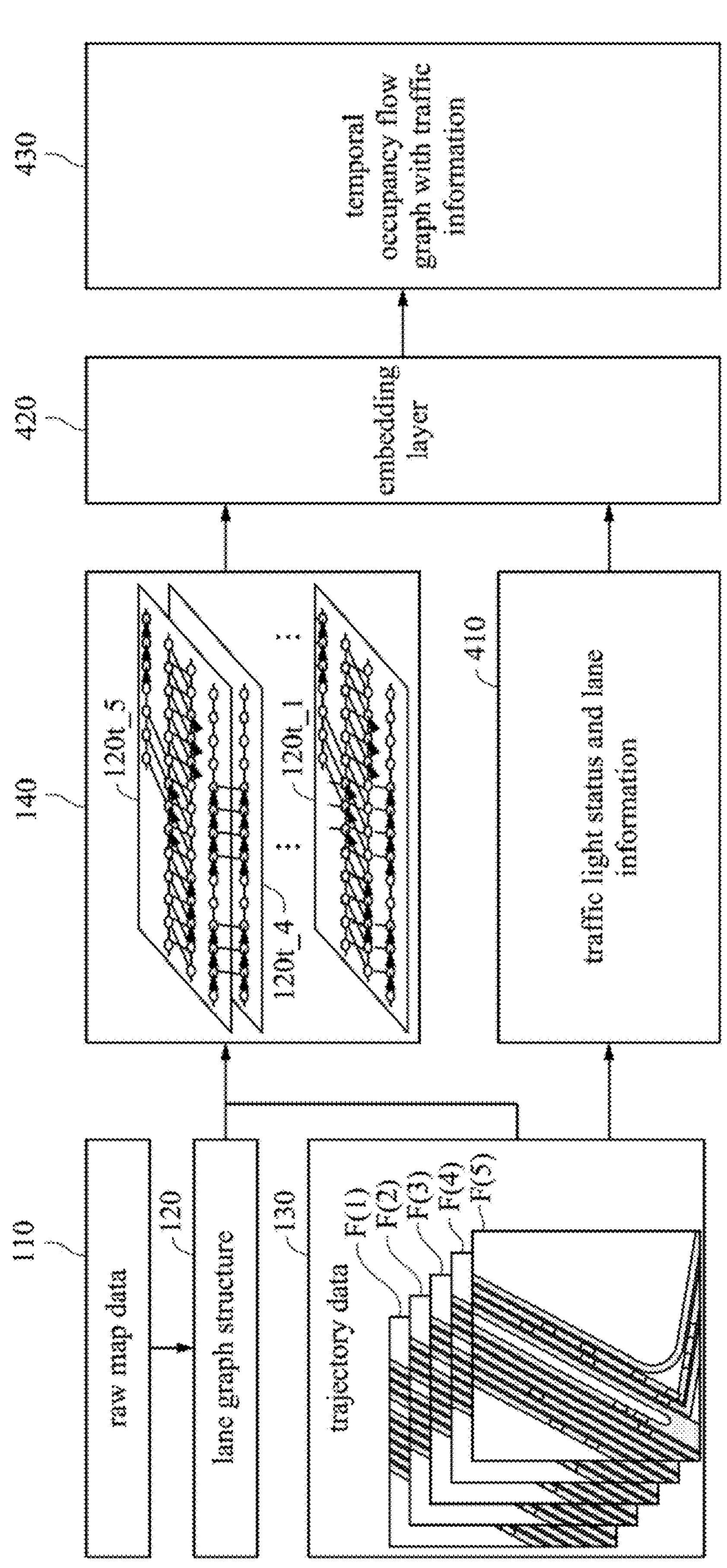
FIG. 8A and FIG. 8B depict schematic diagrams of establishment and utilization of the temporal occupancy flow graph for forecasting the vehicle motion according to some embodiments of the present disclosure.
Figure 8B:
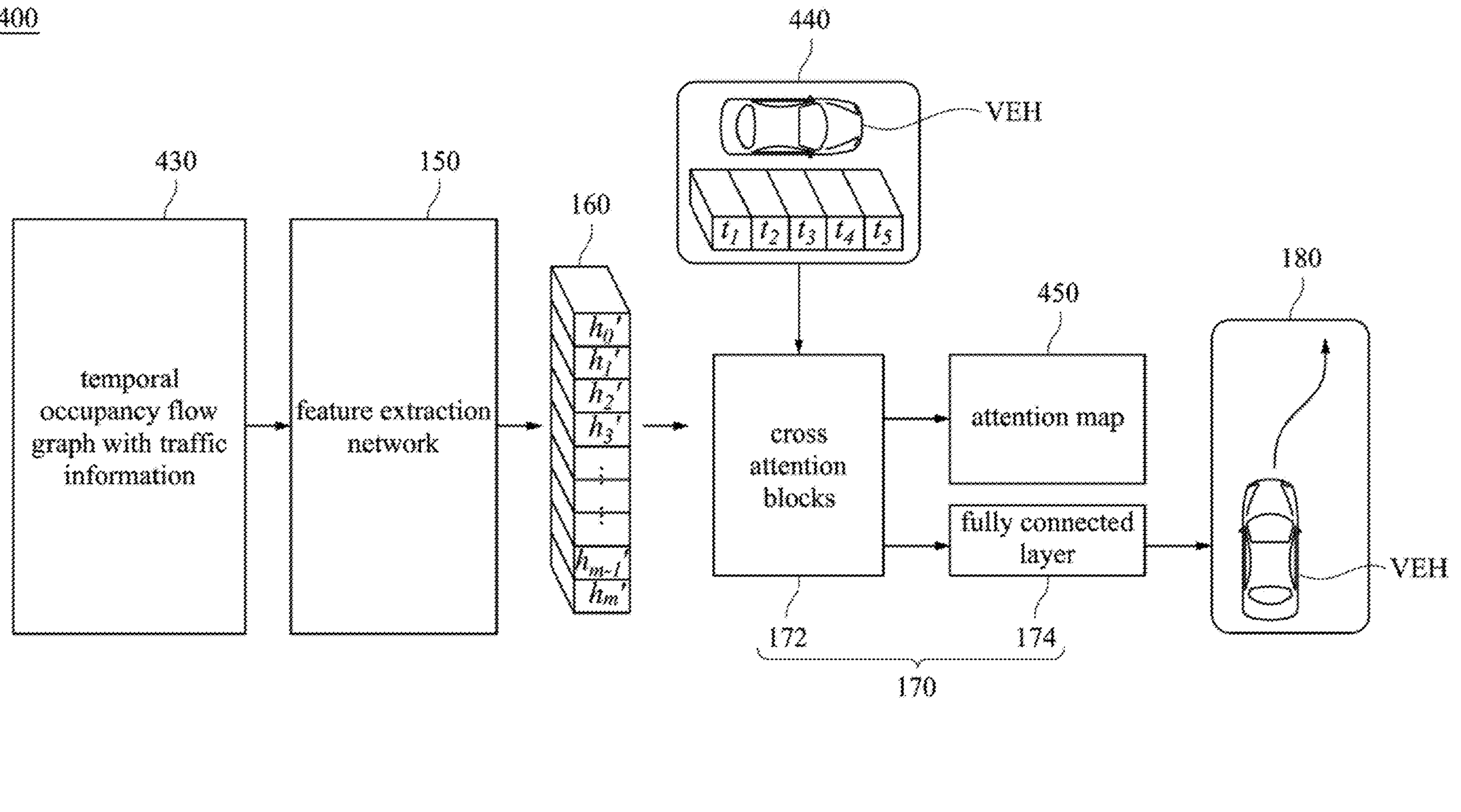

A description is provided with reference to FIG. 8A and FIG. 8B. FIG. 8A and FIG. 8B depict schematic diagrams of architecture 400 of establishment and utilization of the temporal occupancy flow graph 140 for forecasting the vehicle motion according to some embodiments of the present disclosure.

As shown in FIG. 8A, the lane graph structure 120 is established according to the raw map data 110, and the motions of the vehicles in the frames F(1)~F(5) are mapped onto the lane graph structure 120 to generate the occupancy flow graphs 120_1~120_5, the occupancy flow graphs 120_1~120_5 are connected by the temporal edges to construct the temporal occupancy flow graph 140. In some embodiments, the embedding layer 420 embeds the traffic light status and lane information 410 correspond to the time points of the consecutive frames F(1)~F(5) the occupancy flow graphs 120_1~120_5 included in the temporal occupancy flow graph, respectively, in order to establish the temporal occupancy flow graph with traffic information 430.

In some embodiments, the feature extraction network 150 can simultaneously capture vehicle-to-vehicle interaction and the vehicle-to lane interaction from the temporal occupancy flow graph with traffic information 430 in a consistent manner, so as to obtain the updated node features 160, and obtain more accurate prediction results. The computation of the updated node features 160 has been described in the above embodiments, and thus the description is omitted here.

In some embodiments, the cross attention blocks 172 receives the updated node features 160 and the trajectory data 440 of the ego-vehicle VEH at time points $t_1$~$t_5$, in which the time points $t_1$~$t_5$ correspond to the consecutive frames F(1)~F(5) of the input trajectory data 130. In some embodiments, the cross attention blocks 172 generates attention score of ego-vehicle VEH to every node of the temporal occupancy flow graph 140 according to the updated node features 160 and the trajectory data 440 of the ego-vehicle VEH at time points $t_1$~$t_5$, so as to obtain the attention graph 450. In some embodiments, the fully connected layer 174 generates the motion prediction 180 (such as, the path planning 182 or the trajectory prediction 184) of the vehicle VEH in the future period according to the attention score of ego-vehicle VEH to every node of the temporal occupancy flow graph 140.

Figure 9:
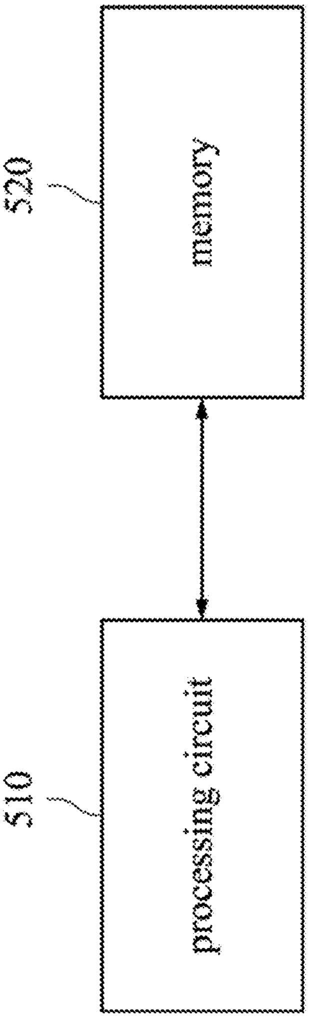
FIG. 9 depicts a schematic diagram of a computing system according to some embodiments of the present disclosure.

A description is provided with reference to FIG. 9. FIG. 9 depicts a schematic diagram of a computing system 500 according to some embodiments of the present disclosure. As shown in FIG. 9, the computing system 500 includes a processing circuit 510 and a memory 520. The memory 520 is configured to store data (such as, the raw map data 110, the trajectory data 130 and 440 and the traffic light status and lane information 410) and the computer executable instructions. In some embodiments, the memory 520 can include dynamic memory, static memory, hard disk and/or flash memory. In some embodiments, the processing circuit 510 is electrically coupled to the memory 520, and access data or instructions stored in the memory 520 to execute the steps of method 200 in FIG. 2 and/or steps of the method 300 in FIG. 3. In some embodiments, the processing circuit 510 includes central processing unit (CPU), graphic processing unit (GPU), tensor processing unit (TPU), application specific integrated circuit (ASIC) or any equivalent processing circuit.

Summary, the vehicles and the lane segments are treated equally as graph nodes in the temporal occupancy flow graph 140. In some embodiments, the spatial edges (such as, the geometric edge, the multi-scale geometric edge and the vehicle interaction edge) of the temporal occupancy flow graph 140 reflect at least two interaction relations (such as, the vehicle-to-vehicle interaction and the vehicle-to lane interaction), and the temporal edges of the temporal occupancy flow graph 140 reflect the spatial-temporal dependencies of the nodes. Therefore, when the feature aggregation is performed on the temporal occupancy flow graph 140, the vehicle-to-vehicle interaction and the vehicle-to-lane interaction can be simultaneously extracted, in order to avoid the information bias caused by extracting the vehicle-to-vehicle interaction and the vehicle-to-lane interaction from different attention layers, and to improve the accuracy of the motion prediction 180 of the ego-vehicle VEH.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A method for vehicle motion forecasting, comprising:

generating a lane graph structure according to a raw map data;

establishing a plurality of occupancy flow graphs which are homogeneous to data format of the lane graph structure according to trajectory data of a plurality of vehicles in a plurality of consecutive frames and the lane graph structure;

establishing a plurality of temporal edges between the occupancy flow graphs according to the trajectory data of the vehicles in the consecutive frames, to construct a temporal occupancy flow graph; and performing feature aggregation on the temporal occupancy flow graph to generating a plurality of updated node features, and generating a motion prediction of an ego-vehicle according to the updated node features, wherein the temporal edges are configured to connect a plurality of lane segments occupied by each of the vehicles in the occupancy flow graphs to each other, in order to express the trajectory data of the vehicles in the consecutive frames, wherein step of establishing each of the occupancy flow graphs comprises:

receiving a plurality of bounding boxes of the vehicles in a frame;

inheriting a plurality of lane segment features of the lane segments and a plurality of geometric edges from the lane graph structure;

computing a plurality of occupant vehicle features of the lane segments according to the bounding boxes and speed information of the vehicles in the frame;

establishing a plurality of vehicle interaction edges by connecting a portion of the lane segments occupied by the bounding boxes, correspondingly; and establishing a plurality of multi-scale geometric edges by connecting p-th lane segment comprised in the lane segments to (p+q)-th lane segment in the same lane, wherein the p-th lane segment is any of the lane segments, and wherein the q is an integer greater than or equal to 2.

2. The method of claim 1, wherein the lane segment features include a start point, an end point and a centroid of each of the lane segments, and wherein the geometric edges are connection between adjacent two of the lane segments based on drivable path.

3. The method of claim 1, wherein step of computing the occupant vehicle features comprising:

computing a vehicle occupancy value of each of the lane segments according to the bounding boxes; and computing an occupancy flow vector of each of the lane segments according to the speed information of the vehicles in the frame.

4. The method of claim 1, wherein step of constructing the temporal occupancy flow graph comprising:

establishing the temporal edges by connecting a plurality of occupied lane segments occupied by the same vehicle in two consecutive frames, correspondingly.

5. The method of claim 1, wherein step of performing the feature aggregation on the temporal occupancy flow graph comprises:

extracting, from the temporal occupancy flow graph, interaction information between the vehicles and interaction information between the vehicles and the lane segments at the same time according to the geometric edges and vehicle interaction edges of each of the occupancy flow graphs.

6. The method of claim 1, wherein step of generating the motion prediction of the ego-vehicle comprises:

inputting the updated node features and a past trajectory of the ego-vehicle in the consecutive frames to a downstream model, as such the downstream model generates the motion prediction of the ego-vehicle.

7. The method of claim 1, further comprising:

embedding traffic light status and lane information to the temporal occupancy flow graph to establish a temporal occupancy flow graph with traffic information; and performing the feature aggregation on the temporal occupancy flow graph with the traffic information to generate the updated node features, and generating the motion prediction of the ego-vehicle according to the updated node features.

8. A computing system, comprising:

a memory, configured to store data and a plurality of instructions; and a processing circuit, connected to the memory, configured to access the data and the instructions stored in the memory to execute the following steps:

generate a lane graph structure according to a raw map data;

establish a plurality of occupancy flow graphs which are homogeneous to data format of the lane graph structure according to trajectory data of a plurality of vehicles in a plurality of consecutive frames and the lane graph structure;

establish a plurality of temporal edges between the occupancy flow graphs according to the trajectory data of the vehicles in the consecutive frames, to construct a temporal occupancy flow graph; and perform feature aggregation on the temporal occupancy flow graph to generating a plurality of updated node features, and generating a motion prediction of an ego-vehicle according to the updated node features, wherein the temporal edges are configured to connect a plurality of lane segments occupied by each of the vehicles in the occupancy flow graphs to each other, in order to express the trajectory data of the vehicles in the consecutive frames, wherein the processing circuit is further configured to:

receive a plurality of bounding boxes of the vehicles in a frame;

inherit a plurality of lane segment features of the lane segments and a plurality of geometric edges from the lane graph structure;

compute a plurality of occupant vehicle features of the lane segments according to the bounding boxes and speed information of the vehicles in the frame;

establish a plurality of vehicle interaction edges by connecting a portion of the lane segments occupied by the bounding boxes, correspondingly; and establish a plurality of multi-scale geometric edges by connecting p-th lane segment comprised in the lane segments to (p+q)-th lane segment in the same lane, wherein the p-th lane segment is any of the lane segments, and wherein the q is an integer greater than or equal to 2.

9. The computing system of claim 8, wherein the lane segment features includes a start point, an end point and a centroid of each of the lane segments, and wherein the geometric edges are connection between adjacent two of the lane segments based on drivable path.

10. The computing system of claim 8, wherein the processing circuit is further configured to:

compute a vehicle occupancy value of each of the lane segments according to the bounding boxes; and compute an occupancy flow vector of each of the lane segments according to the speed information of the vehicles in the frame.

11. The computing system of claim 8, wherein the processing circuit is further configured to:

establish the temporal edges by connecting a plurality of occupied lane segments occupied by the same vehicle in two consecutive frames, correspondingly.

12. The computing system of claim 8, wherein the processing circuit is further configured to:

extract, from the temporal occupancy flow graph, interaction information between the vehicles and interaction information between the lane segments at the same time according to the geometric edges and vehicle interaction edges of each of the occupancy flow graphs.

13. The computing system of claim 8, wherein the processing circuit is further configured to:

input the updated node features and a past trajectory of the ego-vehicle in the consecutive frames to a downstream model, as such the downstream model generates the motion prediction of the ego-vehicle.

14. The computing system of claim 8, wherein the processing circuit is further configured to:

embed traffic light status and lane information to the temporal occupancy flow graph to establish a temporal occupancy flow graph with traffic information.

15. The computing system of claim 14, wherein the processing circuit is further configured to:

perform the feature aggregation on the temporal occupancy flow graph with the traffic information to generate the updated node features, and generating the motion prediction of the ego-vehicle according to the updated node features.

* * * * *